United States Patent [19]
Rohm et al.

[11] Patent Number: 6,112,217
[45] Date of Patent: Aug. 29, 2000

[54] METHOD AND APPARATUS FOR GENERATING CLOCK SIGNALS

[75] Inventors: Peter Rohm, Pfaffenhofen; Patrick Leteinturier, München, both of Germany

[73] Assignee: Siemens Aktiengesellschaft, Munich, Germany

[21] Appl. No.: 09/122,056

[22] Filed: Jul. 24, 1998

[51] Int. Cl.[7] ....................................... G06F 7/52
[52] U.S. Cl. ............................................ 708/103
[58] Field of Search ...................... 708/701, 702, 708/703; 327/113, 114, 115, 116, 117, 119; 331/53

[56] References Cited

U.S. PATENT DOCUMENTS

| | | | |
|---|---|---|---|
| 3,729,623 | 4/1973 | Kelling | 318/603 |
| 3,828,169 | 8/1974 | Fluet | 708/103 |
| 3,864,556 | 2/1975 | Fluet | 708/103 |
| 4,773,031 | 9/1988 | Tobin | 708/103 |
| 5,088,057 | 2/1992 | Amrany et al. | 708/103 |
| 5,854,755 | 12/1998 | Park et al. | 708/103 |

*Primary Examiner*—Chuong Dinh Ngo
*Attorney, Agent, or Firm*—Herbert L. Lerner; Laurence A. Greenberg; Werner H. Stemer

[57] ABSTRACT

A method and an apparatus for generating clock signals is described, by which a period of time can be subdivided into a desired number of essentially equal-length segments. The method and the apparatus are distinguished in that the clock signals are generated based on the outcomes of a repeated subtraction of a first value from a second value. The first value depends on the number of segments into which the period of time to be subdivided is to be subdivided, and the second value depends on the duration of the period of time to be subdivided.

25 Claims, 4 Drawing Sheets

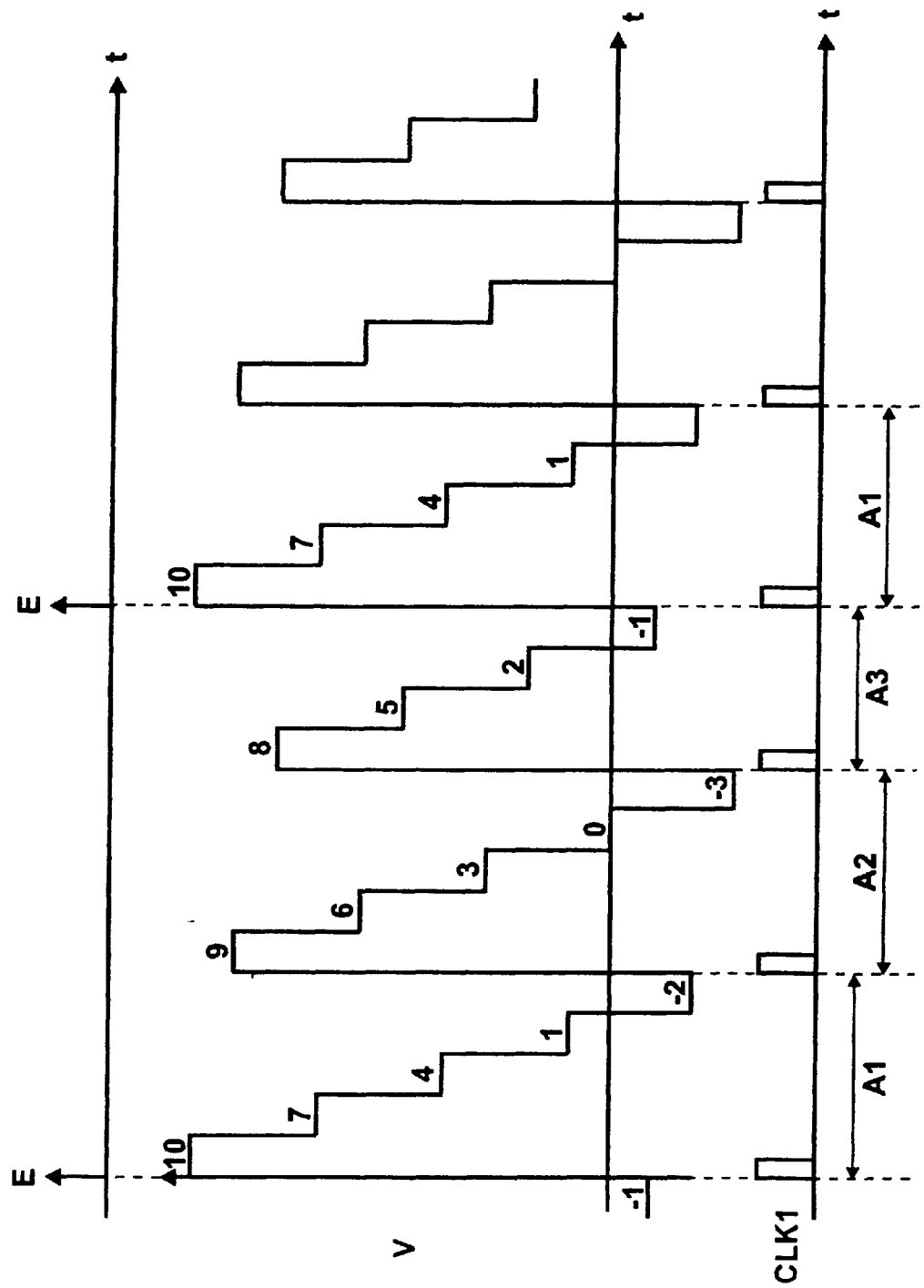

METHOD AND APPARATUS FOR GENERATING CLOCK SIGNALS

BACKGROUND OF THE INVENTION

Field of the Invention

The present invention relates to a method and an apparatus for generating clock signals, by which a period of time can be subdivided into a desired number of essentially equal-length segments.

Methods and apparatuses of this type are needed for instance, in control devices for triggering electrical devices. Specifically, whenever the triggering must be done as a function of certain states of the device to be controlled, for instance as a function of the position of a rotating part of the device to be controlled.

It is true that the device to be controlled can signal the attainment of certain states to the control device. However, it frequently happens that the generation of the control signals that are to be output to the device to be controlled must be done at times that do not coincide with the times at which the control device is informed of the attainment of a particular state.

One way to overcome the problem is to increase the number of states whose attainment is signaled to the control device. However, often this cannot readily be done. For instance, if the position of a rotating shaft is to be detected, then the positions of the shaft whose attainment can be signaled to the control device is limited for practical reasons. For instance, the shaft has a mutual spacing of x degrees, where x, as will be appreciated, cannot be made arbitrarily small.

Another possibility for overcoming the aforementioned problem is to generate a clock signal in the control device, by which signal the time periods, which are located between the signaling of the attainment of certain states of the device to be controlled, can be subdivided into a plurality of segments. However, the generation of these additional clock signals entails relatively major effort and expense and moreover cannot be optimally adapted to given conditions.

SUMMARY OF THE INVENTION

It is accordingly an object of the invention to provide a method and apparatus for generating clock signals which overcome the above-mentioned disadvantages of the prior art devices and methods of this general type, in which the clock signals are generated with minimal expense and can be adapted optimally to the applicable given conditions.

With the foregoing and other objects in view there is provided, in accordance with the invention, a method for generating clock signals for subdividing a period of time into a desired number of substantially equal-length segments, which includes: generating clock signals based on outcomes of repeated subtractions of a first value from a second value, the first value depending en a number of segments into which a period of time to be subdivided is to be subdivided, and the second value depending on a duration of the period of time to be subdivided.

The repeated subtractions are equivalent to performing division in accordance with Euclid's division algorithm. The repeated subtraction of the first value from the second value is thus equivalent in the final analysis to the division of the second value by the first, as done in the methods and apparatuses described in this application. However, actual division does not occur. Dispensing with the division in favor of the repeated subtraction taught herein opens up the opportunity of making the clock signal generation simpler from a practical standpoint and adapting it more flexibly to given conditions. The reason for the easier practical feasibility is above all that division, especially when the divisor is meant to be a variable, entails greater technological effort and expense than a corresponding repeated subtraction. The reason for the increased flexibility is above all that there is no longer any restriction that the time periods to be subdivided have to be subdivided into $2^n$ segments.

In accordance with an added feature of the invention, there is the step of performing the subtraction with an adder for adding two's complement of the first value to the second value.

In accordance with an additional feature of the invention, the clock signals are first clock signals and the method further comprises performing the subtractions at a pace of a second clock signal, and clock periods of the second clock signal are only a small fraction of the duration of the period of time to be subdivided.

In accordance with another feature of the invention, there is the step of setting the second value equal to a number of the clock periods of the second clock signal occurring in the period of time to be subdivided, minus the number of the segments into which the period of time to be subdivided is to be subdivided.

In accordance with a further added feature of the invention, there is the step of setting the first value equal to the number of the segments into which the period of time to be subdivided is to be subdivided.

In accordance with a further additional feature of the invention, there is the step of performing the subtractions of the first value from the second value only if and as long as the second value is greater than or equal to zero.

In accordance with yet another feature of the invention, there is the step of performing an addition of a third value instead of the subtraction of the first value if the second value is less than zero.

In accordance with yet another added feature of the invention, there is the step of setting the third value equal to a number of clock periods of a second clock signal occurring in the period of time to be subdivided, minus the number of segments into which the period of time to be subdivided is to be subdivided.

In accordance with an added feature of the invention there is the step of generating the clock signals if the second value is or was less than zero.

In accordance with another feature of the invention, there is the step of counting a number of the clock signals generated within the period of time to be subdivided.

In accordance with an additional feature of the invention, there is the step of suppressing a generation of further clock signals in a respective period of time if the number of the clock signals generated in a given period of time is equal to the number of the clock signals to be generated in the period of time.

In accordance with a further added feature of the invention, there is the step of generating rapidly still-lacking clock signals if the number of the clock signals generated in a given period of time is less than the number of the clock signals to be generated in the period of time.

With the foregoing and other objects in view there is also provided, in accordance with the invention, an apparatus for generating clock signals for subdividing a period of time into a desired number of substantially equal-length segments, including: means for generating clock signals based on outcomes of repeated subtractions of a first value from a second value, the first value depending on a number of segments into which a period of time to be subdivided is to be subdivided, and the second value depending on a duration of the period of time to be subdivided.

In accordance with an added feature of the invention, the means for generating the clock signals based on the outcomes of the repeated subtractions includes an adder for adding two's complement of the first value to the second value.

In accordance with another feature of the invention, the clocks signals are first clock signals, and including means for generating a second clock signal having clock periods, the second clock signal pacing the repeated subtractions, and the clock periods of the second clock signal being only a small fraction of the duration of the period of time to be subdivided.

In accordance an additional feature of the invention, there is a means for setting the second value equal to a number of the clock periods of the second clock signal occurring in the period of time to be subdivided, minus the number of the segments the period of time to be subdivided is to be subdivided.

In accordance with a further added feature of the invention, the first value is set equal to the number of the segments into which the period of time to be subdivided is to be subdivided.

In accordance with a further additional feature of the invention, the subtractions of the first value from the second value are performed only if and as long as the second value is greater than or equal to zero.

In accordance with yet another feature of the invention, there is a means for performing an addition of a third value instead of the subtraction of the first value if the second value is less than zero.

In accordance with yet another added feature of the invention, there is a means for generating a second clock signal having clock periods, and setting the third value equal to a number of the clock periods of the second clock signal occurring in the period of time to be subdivided, minus the number of the segments into which the period of time to be subdivided is to be subdivided.

In accordance with yet another additional feature of the invention, the clock signals are generated if the second value is or was less than zero.

In accordance with another feature of the invention, there is a means for counting a number of the clock signals generated within the period of time to be subdivided.

In accordance with an added feature of the invention, there is a means for suppressing the generation of further clock signals in a respective period of time if the number of the clock signals generated in a given period of time is equal to the number of the clock signals to be generated in the period of time.

In accordance with a concomitant feature of the invention, there is a means for rapidly generating still-lacking clock signals if the number of the clock signals generated in a given period of time is less than the number of the clock signals to be generated in the period of time.

Other features which are considered as characteristic for the invention are set forth in the appended claims.

Although the invention is illustrated and described herein as embodied in a method and apparatus for generating clock signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a timing diagram of the clock generating circuit;

DESCRIPTION OF THE PREFERRED EMBODIMENTS

Figure 4:
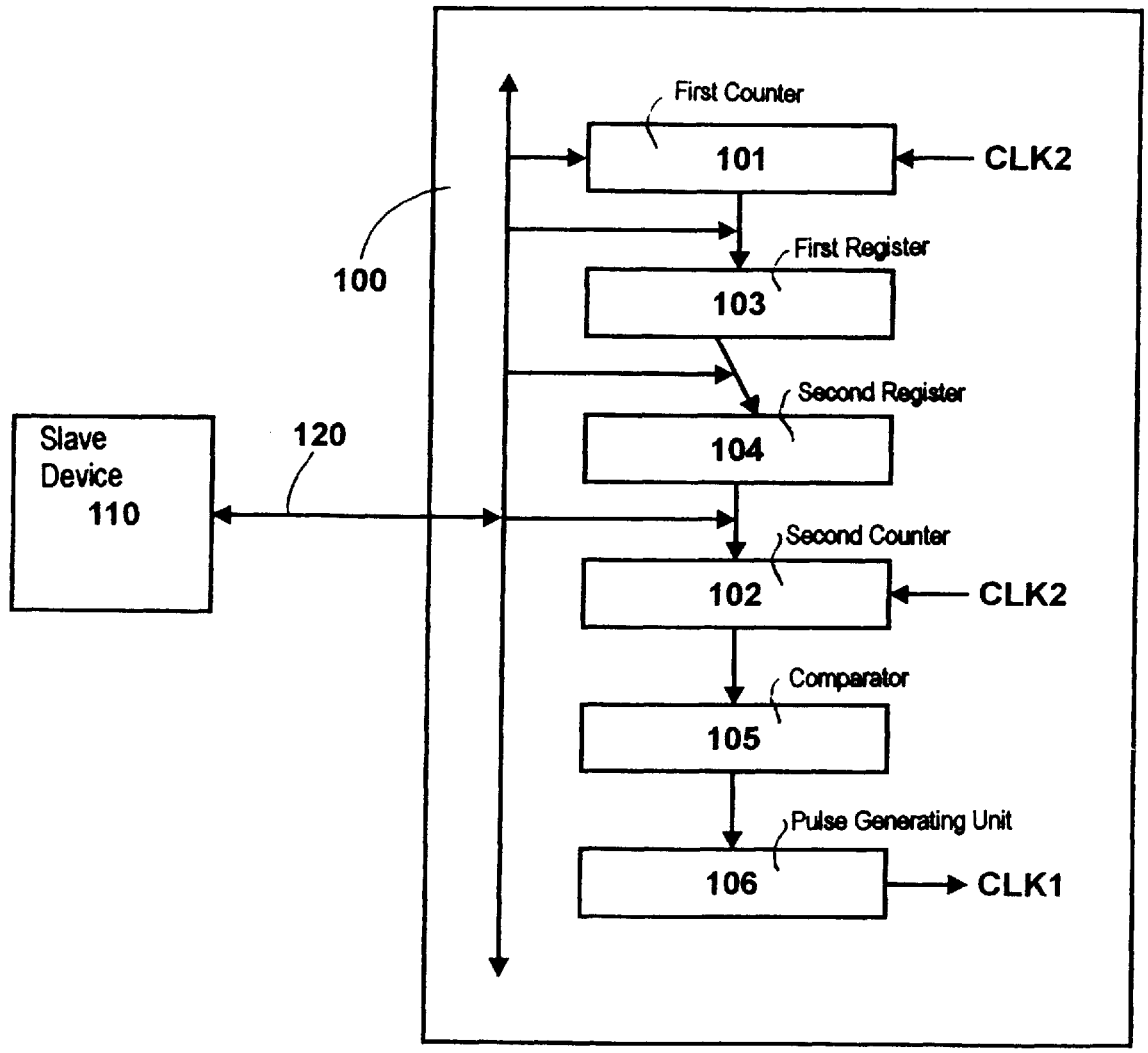
FIG. 4 is a block circuit diagram of the clock generating circuit in which the period of time can be subdivided into a number of substantially equal-length segments according to the prior art.

Referring now to the figures of the drawing in detail and first, particularly, to FIG. 4 thereof, there is shown a prior art control device 100 and a slave device 110 to be controlled by it. The control device 100 includes a first counter 101, a second counter 102, a first register 103, a second register 104, a comparator 105, and a pulse generating unit 106.

The control device 100 and the controlled slave device 110 communicate with one another over one or more control lines 120. Among other purposes, the control lines 120 serve to signal to the control device 100 the attainment of certain states in the controlled slave device 110. The certain states in the example in question may be certain positions of a rotating shaft. For the sake of simplicity, the states will hereinafter be called external events.

The occurrence of such an external event trips various processes in the control device 100. Among others, the instantaneous counting state of the first counter 101 (which counts upward at the pace of a second clock signal CLK2) is transferred to the first register 103 and then reset to zero, whereupon the contents of the first register 103 represent the length of time between the next to last and the last external event. In the steady state of the slave device 110, the time between the next to last and the last external event is equal to the time between the last and the next external event. The time represented by the contents of the first register 103 is the time that is to be subdivided into a desired number of substantially equal-length segments by a clock signal CLK1 to be generated in the control device 100. To generate the clock signal CLK1, the contents of the first register 103 are transferred, with simultaneous shifting of them to the right, into the second register 104. Shifting the contents of the first register 103 upon re-storage in the second register 104 by n places is equivalent to division by $2^n$. The value (of the outcome of division) stored in the second register 104 is then loaded as a starting value into the second counter 103 (which counts downward at the pace of the second clock signal CLK2) and counted downward thereby at the pace at which the first counter 101 counts upward. By use of the comparator 105, the counting state of the second counter 102 is continuously monitored to determine whether it has reached zero. If it is found that the counting state of the second counter 102 has reached zero, then the pulse generating unit 106 is made to generate a counting pulse, and the counting state of the second counter 102 is reset upward to the content of the second register 104, causing the above-described events to be repeated. As the result of all this, $2^n$ pulses are generated in the period of time between the last and the next external event.

The clock pulses represent the clock signal CLK1 to be generated. They make it possible for the generation of control signals, serving to trigger the controlled slave device 110, and/or the output thereof to be done at defined instances between the external events.

Nevertheless, generation of these additional clock signals as described entails relatively major effort and expense and moreover cannot be optimally adapted to given conditions. For instance, the number of pulses that can be generated between two external events is limited to $2^n$ or in other words cannot assume arbitrary values.

The method and apparatus of the invention of the instant application are now described and are intended for use in a control device for generating control signals for triggering electrical devices. The control device, for example, can be a control unit of a motor vehicle.

The control device could be used for controlling an engine of the motor vehicle, and in particular its fuel injection system and ignition system. The triggering of these devices depends, among other factors, on the position of the crankshaft. The attainment of predetermined crankshaft positions is imparted (signaled) to the control unit, and the attainment of the predetermined crankshaft positions is detected by sensors suitable for that purpose. Sensors of this kind are known in many embodiments and require no further description here.

The attainment of a predetermined crankshaft position, signaled by the device to be controlled, will hereinafter be called in general terms an external event. Although in practice, there are normally many other external events besides the attainment of a predetermined crankshaft position, that are signaled to the control device by the device to be controlled. The term "external event" will be used here solely for the attainment of the crankshaft positions to be signaled, for the sake of better comprehension.

It is to be understood that the described method and apparatus can be used for many other functions than in motor vehicle control units, and that the period of time to be subdivided need not be the period of time between the attainment of two particular positions of the rotating shaft. They may also be used in other arbitrary devices in which there are certain periods of time that need to be subdivided.

Figure 1:
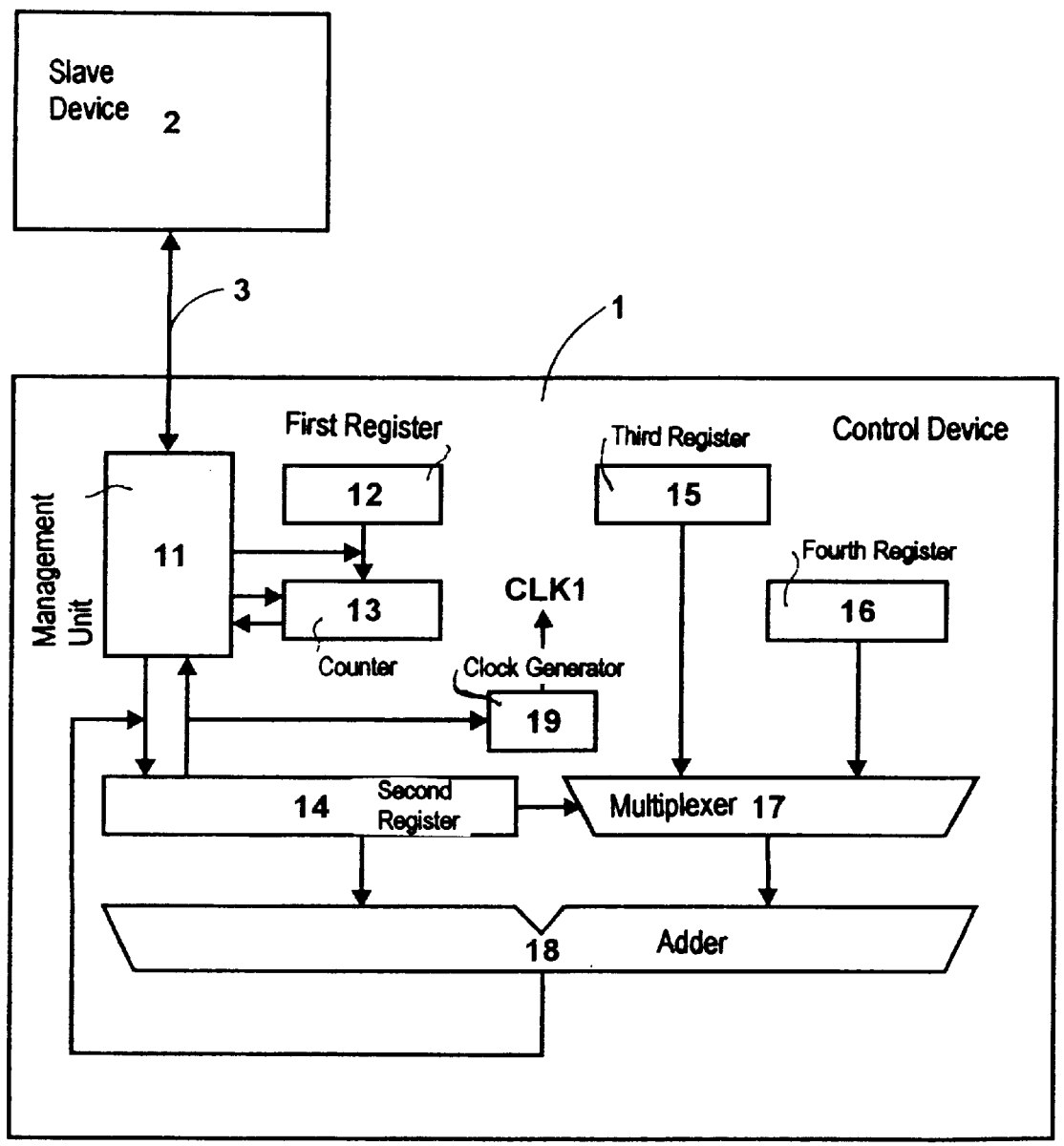
FIG. 1 is a block diagram of a clock generating circuit for generating clock signals by which a period of time can be subdivided into a number of substantially equal-length segments.

FIG. 1 illustrates a control device 1 and a slave device 2 to be controlled. The control device 1 and the controlled slave device 2 are connected to one another via one or more control lines 3. The control device 1 in turn includes a management unit 11, a first register 12, a counter 13, a second register 14, a third register 15, a fourth register 16, a multiplexer 17, an adder 18, and a clock signal generating device 19. For the sake of completeness, it will be noted that the individual components of the configuration are shown and described only to the extent that is of particular significance to the method and apparatus in question here.

The controlled slave device 2 signals the occurrence of external events to the control device 1.

The control device 1, or more specifically its clock signal generating device 19, generates clock signals CLK1, by which the period of time between two external events can be subdivided into a plurality of substantially equal-length segments. The generation of the clock signals CLK1 is based on the results of a repeated subtraction of a first value from a second value, where the first value depends on the number of segments into which the period of time to be subdivided is subdivided, and the second value depends on the duration of the period of time to be subdivided.

The duration of the period of time to be subdivided is ascertained, in the example in question (as in the control device of FIG. 4), by counting the clock periods of a second clock signal that occur between two external events. Ascertaining the number of clock periods may (again as in the control device of FIG. 4) be done using a counter, which counts at the pace of the second clock signal, and is a so-called capture unit. With regard to further details, see the description of the configuration of FIG. 4, and in particular the description of the first counter 101, the first register 103, and the transfer of the counting state of the first counter 101 into the first register 103 (capture function). The device for attaining a variable that represents the duration of the period of time to be subdivided is not shown in FIG. 1. For the sake of completeness, it will be noted that the second clock signal preferably has a very brief period length (a very high clock frequency). The shorter the period length (the higher the clock frequency), the more precisely the length of the period of time to be subdivided can be ascertained and subdivided.

The aforementioned repeated subtraction of the first value from the second value is performed by using the adder 18. The adder 18 adds the two's complement of the first value to the second value. Using the adder 18 for subtraction proves to be advantageous because adders are less expensive than either subtractors or combined adder/subtractors. It is understood that in addition or as an alternative to the adder 18, a subtractor and/or a combined adder/subtractor may be used.

The adder 18 is supplied with the contents of the second register 14 and, via the multiplexer 17, the contents of the third register 15 or the contents of the fourth register 16. The adder 18 adds the contents of the second register 14 and the contents of the third register 15, or the contents of the fourth register 16, and writes the outcome of addition into the second register 14. The additions are done at the pace of the aforementioned second clock signal.

The second register 14 and the third register 15 are loaded with a value that will hereinafter be called a reload value upon the occurrence of an external event. The reload value is the aforementioned second value, that is, a value that is based on a variable that represents the duration of the period of time to be subdivided. The reload value used in the present example is equal to the number of clock periods of the second clock signal that occur within the period of time to be subdivided, minus the number of segments into which the period of time to be subdivided is to be subdivided. It should already be pointed out at this point that at least the second register 14 can also be loaded with a value deviating from the aforementioned reload value; as will be better understood hereinafter, in this way the length ratios of the individual time segments can be influenced.

The fourth register 16 is loaded with the number of segments, or more precisely with the two's complement of the number of segments, into which the period of time to be subdivided is to be subdivided. The number of segments into which the period of time to be subdivided is subdivided is the first value already mentioned above.

Which values the adder 18 adds depends on the instantaneous content of the second register 14. If and as long as the contents of the second register 14 are greater than or equal to zero (or less than or equal to a particular other value), the multiplexer 17 is triggered such that it switches the contents of the fourth register 16 through to the adder 18. If the contents of the second register 14 are less than zero (or less than a particular other value), the multiplexer 17 is triggered such that it switches the contents of the third register 15 through to the adder 18.

The case where the contents of the fourth register 16 are switched through to the adder 18 will now be considered.

In that case, the number of segments into which the period of time to be subdivided is subdivided (that is, the first value) is subtracted repeatedly by the adder 18, at the pace of the second clock signal, from the second register 14 initially loaded with the reload value (the second value). This is done long enough (often enough) that the result becomes less than zero. When the result becomes less than zero, a clock pulse is generated by the clock signal generating device 19, and the multiplexer 17 is switched over.

The clock pulse generated is a component of the clock signal CLK1 to be generated by the described configuration.

The switchover of the multiplexer 17 has the effect that in the next addition by the adder 18, the contents of the second register 14 and the contents of the third register 15, that is, the result of the preceding subtractions, and the reload value already mentioned above are added to together. The result of this addition is again written into the second register 14, causing its contents to become positive again. The effect of the positive contents of the second register 14 is that the multiplexer 17 is switched over, and once again the contents of the fourth register 16 are switched through to the adder 18. As a result, once again the adder 18 performs a repeated subtraction of the number of segments, into which the period of time to be subdivided is to be subdivided, from the contents of the second register 14. This is again done long enough (often enough) that the result becomes less than zero. Once the result becomes less than zero, a clock pulse is again generated by the clock signal generating device 19 and the multiplexer 17 is switched over.

These events repeat until so many clock pulses have been generated that the period of time to be subdivided is subdivided into the desired number of segments.

The events described above will be illustrated again below in terms of a practical example with reference to FIG. 2.

It is assumed here that the period of time to be subdivided (the period of time between two external events) lasts for fourteen clock periods of the second clock signal, and that this period of time is to be subdivided into three segments. It will also be assumed that the system is in a steady state and that other conditions can prevail temporarily upon startup of the system and in phases involving dynamic changes.

FIG. 2 shows the external events (E) and the courses over time of the contents of the second register 14 (curve V) and of the clock signal (curve CLK1) that subdivides the period of time between two external events.

The period of time between two external events is subdivided by the clock signals CLK1, generated as described, into three segments as desired. The first segment (A1) lasts for five clock periods of the second clock signal, the second segment (A2) lasts for five clock periods of the second clock signal, and the third segment (A3) lasts for four clock periods of the second clock signal.

The illustration in FIG. 2 is readily understood along with the above descriptions of the layout, function and mode of operation of the configuration shown in FIG. 1 and requires no further explanation.

The described way in which the clock signals are generated proves to be advantageous in multiple respects.

One of the advantages is that the division usually performed in the prior art of the variable that represents the time between two external events is replaced by a repeated subtraction, and as a result on the one hand the clock signal generation is feasible practically in an especially simple way, and on the other is adaptable more flexibly to given conditions.

The reason for the simpler practical feasibility is above all that division, particularly if the divisor is to be variable, entails greater technological effort and expense than a corresponding repeated subtraction. The reason for the increased flexibility is above all that there is no longer any restriction of having to subdivide the periods of time to be subdivided into $2^n$ segments.

The replacement of the division by repeated subtraction goes back to Euclid's division algorithm, according to which $$N=Q*D+R$$

where N, Q, D and R are integral variables, and where with reference to the present application:

N stands for a variable that represents the duration of the period of time to be subdivided;

D stands for the number of segments into which the period of time to be subdivided is subdivided;

Q stands for a variable that represents the length of the D segments; and

R stands for the remainder from the division.

In the example in question here, the remainder R is automatically distributed as uniformly as possible among the individual segments into which the period of time to be subdivided is subdivided and is another advantage of the described clock signal generation. More precisely, the period of time N to be subdivided is divided into D–R segments of length Q and R segments of length Q+1, and—if for N, the clock periods of the second clock signal that occur between two external events is used—then Q and Q+1 represent the number of clock periods of the second clock signal per time segment.

The uniform distribution of the remainder is accomplished by providing that the contents of the second register 14, after a clock pulse has been generated, are not simply reset for instance to the reload value or some other constant value but rather are set to the outcome of the addition of the instantaneous register contents and the reload value.

In principle, however, it would also be possible for the contents of the second register 14, after the generation of a clock pulse, to be set to the reload value or some other constant value. Although then, of the segments into which the period of time to be subdivided is to be subdivided, the last segment would be greater (longer) by the remainder R than the other segments, nevertheless in certain applications (in which this causes no functional problems) this can certainly be tolerated, and moreover also occurs, among others, in the configured described with reference to FIG. 4. In the division performed there (by shifting the value to be divided to the right), the remainder R is in fact simply cut off and not taken into account, and thus in effect, it is again simply added to the last segment of the period of time to be subdivided.

In the clock signal generation described, it is assumed that the time interval between the last external event and the next external event is precisely as large as the interval between the next to last external event and the last external event. The controlled slave device 2 is embodied such that this is true in steady state operation. However (for instance in the event of changes in the shaft rpm), differences sometimes occur. So that these differences will be unable to have any, or at least any significant, influence on the control of the device to be controlled, the present control device monitors the situation so that too many or too few clock pulses are not generated under any circumstances.

This is accomplished by the first register 12 and the counter 13.

In the first register 12, the number of segments into which the period of time to be subdivided is to be subdivided is stored in memory. The contents of the register 12 are written as a counting value into the first counter 13 at certain instants, which in the normal situation coincide with the occurrence of an external event, and the first counter 13 decreases this counting value at the pace of the clock pulses generated (which subdivide the period of time between two external events, that is, at the pace of the clock signal CLK1).

Normally, that is, when the times between successive external events are constant, the counting value of the counter 13 has just reached the value of zero when an external event occurs. If the time between two external events is shorter than expected, then by the time the external event occurs the counting state of the counter 13 has not yet reached the value of zero. Thereupon (regardless of the contents of the second register 14), enough clock pulses are generated in the fastest possible succession until the counting state of the counter 13 has reached the value of zero. Only after that are the operations normally to be done when an external event occurs performed. If the time between two external events is longer than expected, then the counting state of the counter 13 will already have reached the value of zero more or less long before the occurrence of the external event. The generation of further clock pulses is thereupon suppressed. Once the expected external event occurs, the clock pulse generation is then continued in the usual way.

Figure 3A:
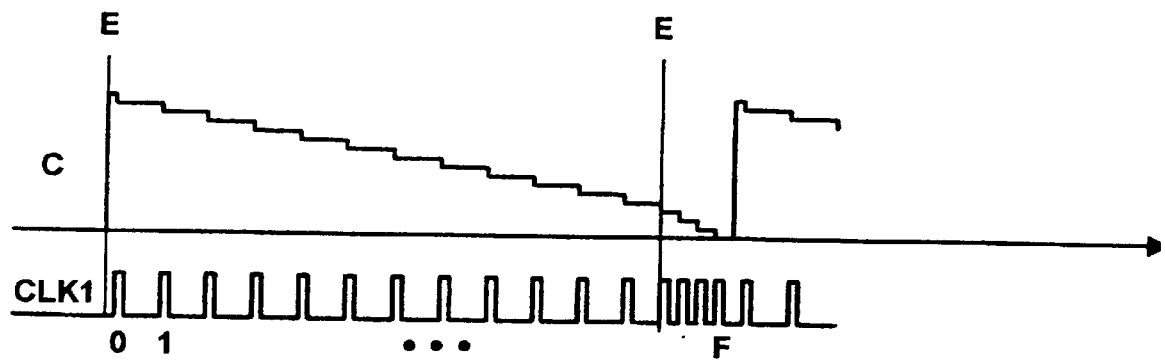
FIG. 3A is a timing diagram for illustrating a function of the clock generating circuit for the case where a period of time to be subdivided is shorter than expected.
Figure 3B:
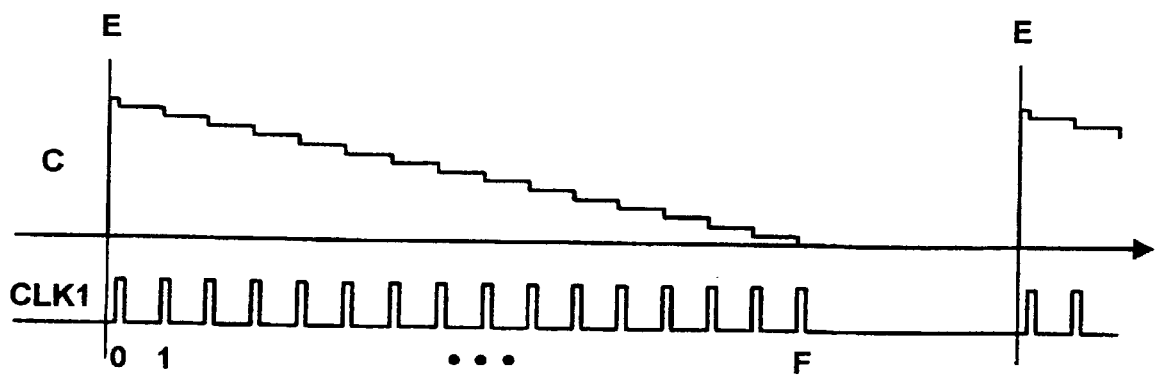
FIG. 3B is a timing diagram for illustrating the function of the clock generating circuit for the case where the period of time to be subdivided is longer than expected.

These processes are illustrated in FIGS. 3a and 3b. FIG. 3a shows the situation that occurs when the time between two external events is shorter than expected, and FIG. 3b shows situation that occurs when the time between two external events is longer than expected. In both cases, E indicates the occurrence of an external event, C the counting state of the counter 13, and CLK1 the clock signal CLK1 to be generated. In the illustration in FIGS. 3a and 3b, it was assumed that 16 clock pulses (clock pulses O–F) are to be generated between two external events.

As the above description shows, the described apparatus and method prove to be advantageous in various respects. They make it possible in an astonishingly simple way to generate clock signals by which a period of time is subdivided into a desired number of substantially equal-length segments.

We claim:

1. A method for generating clock signals for subdividing a period of time into a desired number of substantially equal-length segments, which comprises:

generating clock signals based on outcomes of repeated subtractions of a first value from a second value, the first value depending on a number of segments into which a period of time to be subdivided is to be subdivided, and the second value depending on a duration of the period of time to be subdivided.

2. The method according to claim 1, which comprises performing the subtractions with an adder for adding two's complement of the first value to the second value.

3. The method according to claim 1, wherein the clock signals are first clock signals and the method further comprises performing the subtractions at a pace of a second clock signal, and clock periods of the second clock signal are only a small fraction of the duration of the period of time to be subdivided.

4. The method according to claim 3, which comprises setting the second value equal to a number of the clock periods of the second clock signal occurring in the period of time to be subdivided, minus the number of the segments into which the period of time to be subdivided is to be subdivided.

5. The method according to claim 1, which comprises setting the first value equal to the number of the segments into which the period of time to be subdivided is to be subdivided.

6. The method according to claim 1, which comprises performing the subtractions of the first value from the second value only if and as long as the second value is greater than or equal to zero.

7. The method according to claim 6, which comprises performing an addition of a third value instead of the subtraction of the first value if the second value is less than zero.

8. The method according to claim 7, which comprises setting the third value equal to a number of clock periods of a second clock signal occurring in the period of time to be subdivided, minus the number of the segments into which the period of time to be subdivided is to be subdivided.

9. The method according to claim 1, which comprises generating the clock signals if the second value is or was less than zero.

10. The method according to claim 1, which comprises counting a number of the clock signals generated within the period of time to be subdivided.

11. The method according to claim 10, which comprises suppressing a generation of further clock signals in a respective period of time if the number of the clock signals generated in a given period of time is equal to the number of the clock signals to be generated in the period of time.

12. The method according to claim 10, which comprises generating rapidly still-lacking clock signals if the number of the clock signals generated in a given period of time is less than the number of the clock signals to be generated in the period of time.

13. An apparatus for generating clock signals for subdividing a period of time into a desired number of substantially equal-length segments, comprising:

means for generating clock signals based on outcomes of repeated subtractions of a first value from a second value, the first value depending on a number of segments into which a period of time to be subdivided is to be subdivided, and the second value depending on a duration of the period of time to be subdivided.

14. The apparatus according to claim 13, wherein said means for generating said clock signals based on the outcomes of the repeated subtractions includes an adder for adding two's complement of the first value to the second value.

15. The apparatus according to claim 13, wherein said clocks signals are first clock signals, and including means for generating a second clock signal having clock periods, said second clock signal pacing the repeated subtractions, and said clock periods of said second clock signal being only a small fraction of the duration of the period of time to be subdivided.

16. The apparatus according to claim 15, including means for setting the second value equal to a number of said clock periods of said second clock signal occurring in the period of time to be subdivided, minus the number of the segments into which the period of time to be subdivided is to be subdivided.

17. The apparatus according to claim 13, wherein the first value is set equal to the number of the segments into which the period of time to be subdivided is to be subdivided.

18. The apparatus according to claim 13, wherein the subtractions of the first value from the second value are performed only if and as long as the second value is greater than or equal to zero.

19. The apparatus according to claim 18, including means for performing an addition of a third value instead of the subtraction of the first value if the second value is less than zero.

20. The apparatus according to claim 19, including means for generating a second clock signal having clock periods, and setting the third value equal to a number of said clock periods of said second clock signal occurring in the period of time to be subdivided, minus the number of the segments into which the period of time to be subdivided is to be subdivided.

21. The apparatus according to claim 13, wherein said clock signals are generated if the second value is or was less than zero.

22. The apparatus according to claim 13, including means for counting a number of said clock signals generated within the period of time to be subdivided.

23. The apparatus according to claim 22, including means for suppressing the generation of further clock signals in a respective period of time if the number of said clock signals generated in a given period of time is equal to the number of said clock signals to be generated in the period of time.

24. The apparatus according to claim 22, including means for rapidly generating still-lacking clock signals if the number of said clock signals generated in a given period of time is less than the number of said clock signals to be generated in the period of time.

25. An apparatus for generating clock signals for subdividing a period of time into a desired number of substantially equal-length segments, comprising:

an adder for generating clock signals (CLK1) based on outcomes of repeated subtractions of a first value from a second value, the first value depending on a number of segments into which a period of time to be subdivided is to be subdivided, and the second value depending on a duration of the period of time to be subdivided.

* * * * *